Figure 1:
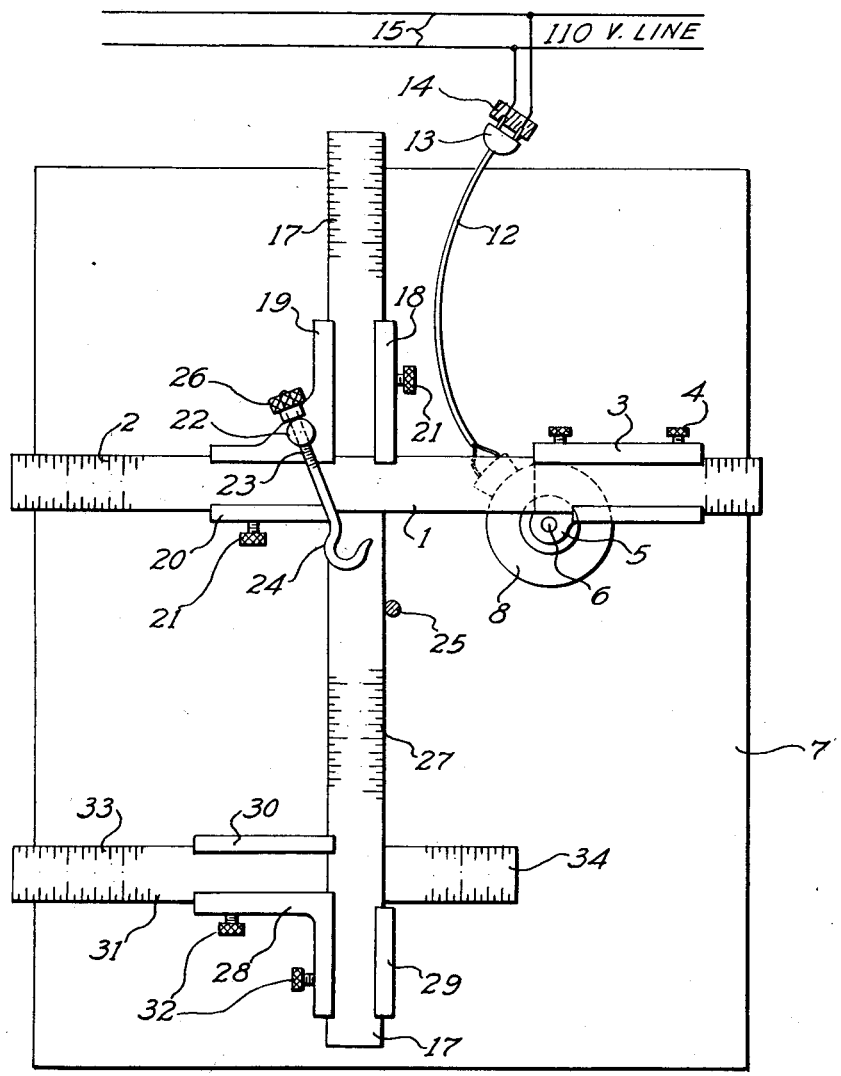

July 2, 1929.　　　J. C. SHAW ET AL　　　1,719,812
TEMPLATE GENERATOR
Filed Oct. 6, 1925　　　4 Sheets-Sheet 1

July 2, 1929.  J. C. SHAW ET AL  1,719,812
TEMPLATE GENERATOR
Filed Oct. 6, 1925   4 Sheets-Sheet 2

INVENTOR.
John C. Shaw and
BY Robert D. Shaw
ATTORNEYS.

July 2, 1929.  J. C. SHAW ET AL  1,719,812
TEMPLATE GENERATOR
Filed Oct. 6, 1925   4 Sheets-Sheet 3
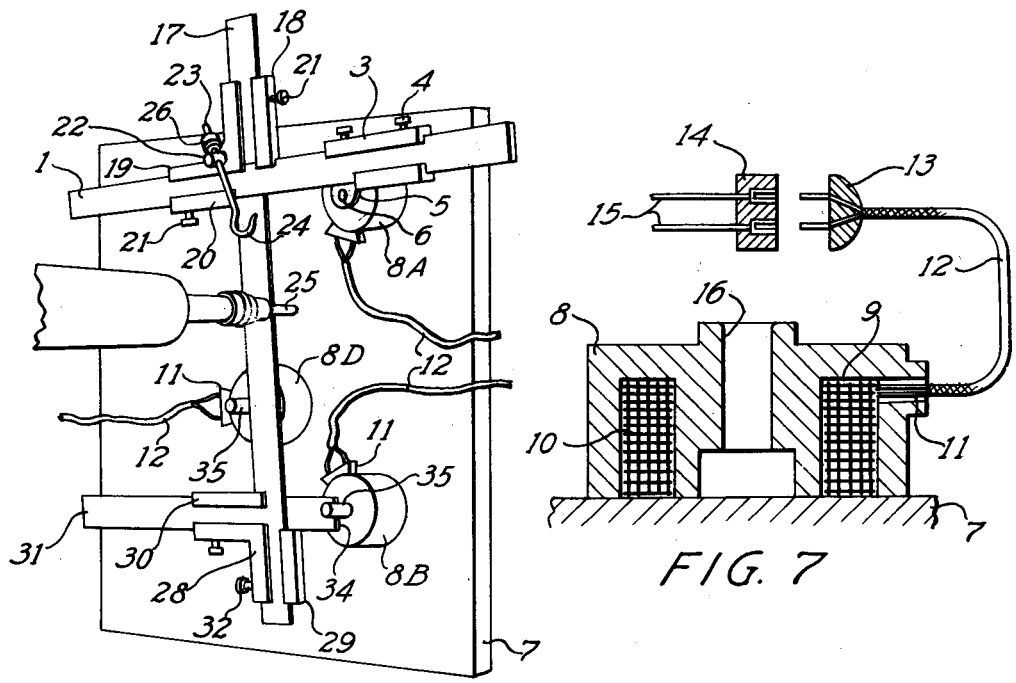
FIG. 4
FIG. 7
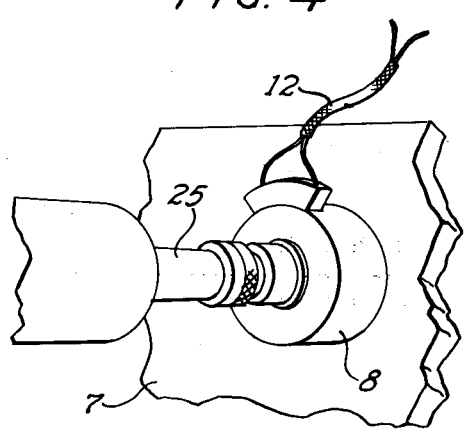
FIG. 5
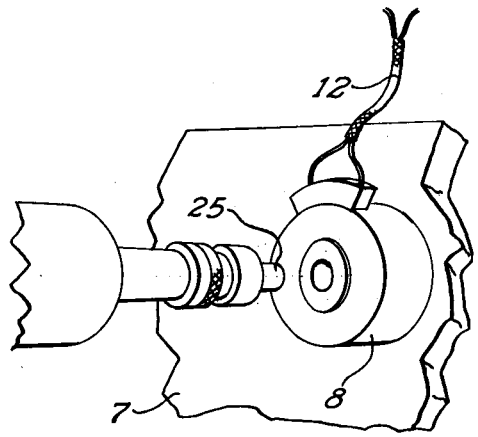
FIG. 6
INVENTOR.
John C. Shaw and
BY Robert D. Shaw
ATTORNEYS.

Patented July 2, 1929.

1,719,812

UNITED STATES PATENT OFFICE.

JOHN C. SHAW AND ROBERT D. SHAW, OF BROOKLYN, NEW YORK, ASSIGNORS TO KELLER MECHANICAL ENGINEERING CORPORATION, OF BROOKLYN, NEW YORK, A CORPORATION OF NEW YORK.

TEMPLATE GENERATOR.

Application filed October 6, 1925. Serial No. 60,805.

Our invention relates more particularly to an improved method and apparatus or device for generating templates or for cutting irregular forms, by direct measurements, which may be taken from drawings or the like and laid out on a tracer controlled machine tool.

Our improvement is more particularly adapted for use in connection with machine tools employing a contouring tracer, such as shown and described in the application of John C. Shaw, Ser. No. 696,827, filed March 4, 1924, for electrical operation and control of machine tools. The form of machine tool preferably employed is more particularly adapted for duplicating work from a pattern and, in connection with a contouring tracer, for reproducing contours of various shapes and forms, in accordance with patterns, which the contouring tracer is adapted to follow.

In forming templates of various shapes, it is sometimes desirable, where only one piece of a given form is to be cut, to be able to do this directly without the preliminary of making a pattern and, where duplicates are to be made, it is desirable to form the preliminary pattern or template for reproducing the duplicates. Therefore, the object of our improvement is to provide a method and apparatus for cutting templates directly from the measurements of the drawings, thereby enabling the operator to lay out the work on the machine and execute it without the necessity of constructing or cutting a pattern.

A further object is to provide electro-magnetic pivot or center buttons, resembling ordinary tool maker buttons, except that they are adapted to be attached to the face of the fixture plate by energizing magnet coils in the respective buttons. These magnetic buttons, except for size, resemble the magnetic clutches shown and described in the above mentioned application.

A further object is to provide, and pivotally support an adjustable radius arm for rotation about a predetermined point, such as one of the magnetic buttons attached to the fixture plate of the machine tool, the radius arm being adapted to control the movement of the tracer, which would, therefore, be required to follow a circular path about the pivotal button as a center. The radius arm used is preferably a graduated scale bar, enabling the length of the radius arm to be readily determined, so that the curve generated will correspond to that required according to measurements on the drawings or plan of the template or form to be cut.

A further object is to provide additional graduated scale bars associated with the radius arm in such a way as to provide means for laying out straight line measurements that may be required in producing the templates or form desired. One of the associated scales thus provided may preferably form a stop or member for limiting the rotary movement of the radius arm, and may be adjusted according to the given dimensions required.

Figure 3:
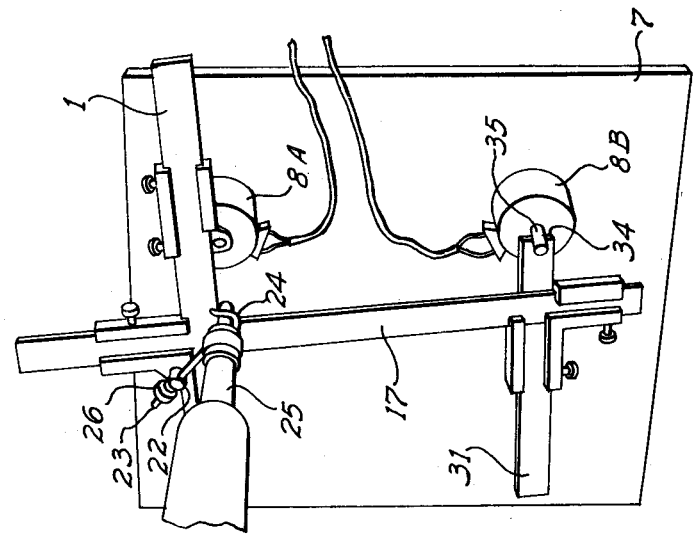
Figure 2:
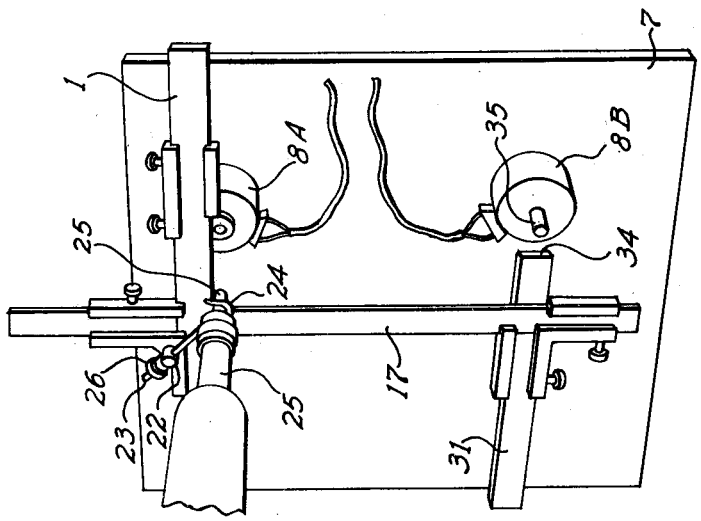
Figure 8:
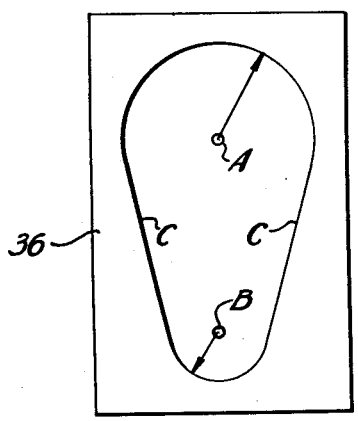
Figure 9:
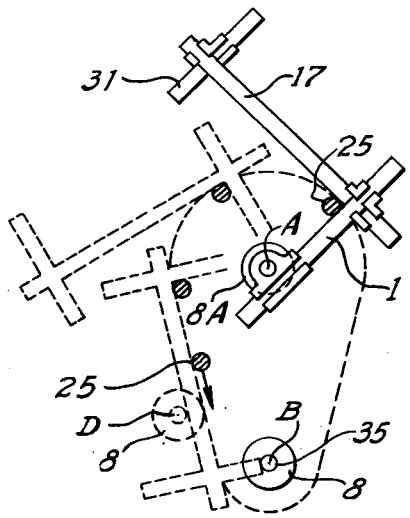
Figure 10:
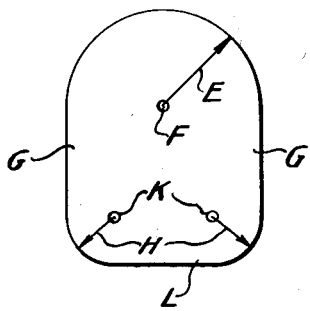
Figure 11:
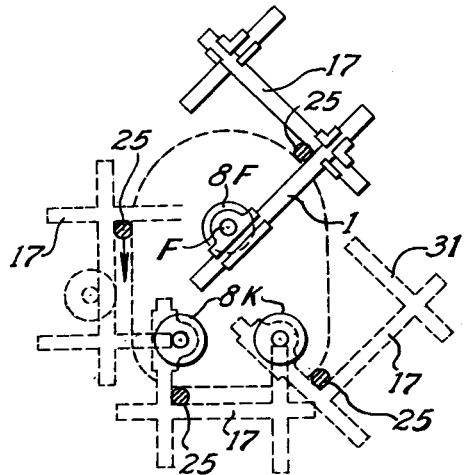

Our improvement is readily adapted for use for cutting templates or forms with either interior or exterior profile and one form of apparatus which we have found to be satisfactory is more particularly shown in the accompanying drawings, in which Fig. 1 represents a plan view of our improved template generator, before it is attached to the tracer; Fig. 2 illustrates the template generator harnessed or secured to the tracer point; Fig. 3 is a view similar to Fig. 2, with the template generator prevented from further rotation counter-clockwise by the engagement of the lower scale bar with the stop of a magnetic button; Fig. 4 shows the template generator substantially in the position of Fig. 3, but held in this position by an additional magnetic button, while the tracer is released from the radius arm and adapted to follow the straight edge; Fig. 5 illustrates the method of locating the magnetic buttons by moving them to the desired position supported on the tracer point; Fig. 6 shows the magnetic button after it has been located and secured to the fixture by energizing the button so that the tracer point may be removed therefrom; Fig. 7 is a transverse section of one of the magnetic buttons, illustrating the construction thereof; Fig. 8 is a plan view of a simple form of template which may be reproduced by our method; Fig. 9 illustrates graphically the steps followed in generating the template shown in Fig. 8; Fig. 10 represents an outside contour or profile form which may be generated by our method and apparatus; and Fig. 11 illustrates steps in the operation of generating the punch or outside contour form shown in Fig. 10.

Referring to the drawings, it will be seen that our improved template generator preferably comprises a radius arm 1, formed as a graduated scale bar provided with graduations 2, which may be of the usual or any preferred form. The radius arm 1 is preferably provided with a pivot slide 3, adapted to slide along one end of the scale bar or radius arm and may be secured thereto in any adjusted position by a suitable set screw 4. The pivot slide 3 is preferably provided with a laterally extending ear 5, having a pivot pin 6, adapted to form the pivot of the radius arm. The pivot 6 of the radius arm may be supported on the fixture plate 7 of the machine tool, with which our improvement is adapted to be operated, by any suitable supporting means, but in the present instance, we preferably employ a magnetic button 8, which may be secured to the face of the fixture plate 7 by energizing magnetic coils in the button, as hereinafter described.

The magnetic button 8, as will be seen in Fig. 7, resembles somewhat, the ordinary tool makers button, except that it is provided with an annular cavity at 9, in which there is mounted a coil of wire 10, for magnetizing the button when a current of electricity is passed through the coil. The magnetic button 8 is preferably provided with an outlet opening at 11, through which the ends of the cord 12 are connected to the coil 10, the cord carrying at its end the usual attachment plug 13. The attachment plug 13 is adapted to be inserted in and cooperate with the usual socket 14, preferably connected with the usual 110 volt line circuit 15, or any suitable current for energizing the magnetic button 8 while the attachment plug 13 is placed in the socket 14. The magnetic buttons 8 are preferably provided with a central bore 16, which may be of standard size and into which the pivot 6 of the radius arm 1 may be inserted, so that the radius arm may rotate thereabout.

In addition to the radius arm 1, the template generator preferably includes a graduated scale bar 17, slidably mounted in a slide 18 of a square or right angled slide bracket 19, the other slide 20 of which is slidably mounted on the graduated scale 1 forming the radius arm previously referred to. The square slide bracket 19 is adapted to be held in any adjusted position with relation to the scale bars 1 and 17 by means of set screws 21, as will be seen in Fig. 1. The square slide bracket 19 is preferably provided with a swivel stud 22, having a hole transversely thereof, in which there is mounted the threaded shank 23, of a hook 24, adapted to engage the point 25 of the tracer and hold the latter to the radius arm 1, that is, in the angle between the scale bars 1 and 17, as will be seen in Fig. 2. The threaded shank 23 of the hook 24 is provided with a nut 26, whereby the hook may be adjusted to draw and hold the tracer point 25 of the tracer snugly in the corner between the radius arm 1 and the scale bar 17.

The scale bar 17, extending at right angles to the radius arm 1, is preferably provided with graduations 27, so that the measurements may be readily laid out thereon, and it will be understood that it is intended to serve also as a straight edge for guiding the tracer, when it is desired to reproduce a straight portion of the template. Such straight portion of the template is usually tangent to a circular arc portion adapted to be generated by the radius arm 1 and hence, the scale bar 17—27 is preferably provided with a second square or right angled slide bracket 28 which is provided with a slide 29, adapted to slide on the scale bar 17, while at right angles thereto the slide 30 carries a graduated scale bar 31, slidably adjustable transversely of the scale bar 17, and parallel to the radius arm or scale bar 1. Set screws 32 are provided in the square slides 29 and 30, for adjustably securing the scale bars 17 and 31 in adjusted position. The graduations 33 of the scale bar 31 are adapted for laying out the distance from the end 34 of the scale bar 31 to the straight edge portion of the scale bar 17 and thereby locate the radius of the lower curved portion of the template illustrated, which is tangent to the straight portion thereof corresponding to the straight edge of the scale bar 17. In order to stop the generating movement of the tracer about the pivot center 6, so that the inner edge of the scale bar 17 will be parallel to the tangent of the upper curve to be generated and also tangent to the lower curve to be generated. The center of the lower curve is preferably established by means of a magnetic button 8B carrying a stop pin 35, with which the end 34 of the scale bar 31 is adapted to engage, as will be seen in Fig. 3, to stop or prevent further rotation of the generating apparatus counter-clockwise, as viewed in Fig. 2.

The method of operating our improved template generator may be illustrated by describing the operation in generating a simple form of template, such as shown in Fig. 8, where a sheet metal plate 36 is adapted to be cut out with a wedge-shaped opening having substantially semi-circular ends. The upper curve of the template in the example shown in Fig. 8 has a three inch radius from the center A, while the lower curve is on a 1½ inch radius from the center B. The two curves are connected by the straight tangent lines C, thereby completing the contour of the template to be generated. The centers A and B in the example given, are represented as 6 inches apart. For generating a template of this character, the upper center A is laid out on the machine preferably by mounting one of the magnetic buttons 8 on the tracer point 25, as shown in Fig. 5 and moving it by means of the feeds of the machine to the desired point over the fixture plate 7 and then by inserting the attachment plug 13 in the socket 14, the button 8 will become energized and attach itself to the face of the fixture plate 7, as shown in Fig. 6, which shows the magnetic button attached to the fixture plate and the tracer point 25 just after being withdrawn therefrom, thereby establishing the center A, (or B, as the case may be), for the proposed template to be generated. Similarly, the lower center B is established by means of a second magnetic button B—8, which may be provided with the stop plug 35, as previously indicated. After the centers A and B have been established by attaching magnetic buttons 8 to the fixture plate 7, the pivot center in the radius arm slide 3 is set, so as to hold the tracer point 25, three inches from the pivot 6; the tracer point being held in the angle between the scale bars 1 and 17, by means of the hook 24, as previously described and as shown in Figs. 3 and 4.

For the template shown in Fig. 8, the lower transverse scale bar 31 is then adjusted along the scale bar 17, so as to lie approximately 6 inches from the radius arm scale bar 1, and its end 34 is adjusted so that it will be 1½ inches from the scale 17, on the assumption that the stud 35 is of the same diameter as the tracer point 25. After the centers A and B have been established as indicated and the generator scale bars properly adjusted, the plate 36 should be secured to the fixture in position to be operated upon by the cutter, after the plate has been drilled or otherwise provided with a suitable opening for the entrance of the cutter at the point where it is desired to begin the operation of cutting the template. The start of cutting the template is illustrated in Fig. 8, is preferably at the upper right hand portion of the circular arc, about the center A, so that the motion of the tracer and cutter will be from right to left or counter-clockwise as indicated in Fig. 9, which illustrates diagrammatically several points or positions in the movement of the tracer 25 under the control of the radius arm 1, the various scale bars being indicated by dotted lines. When the radius arm 1 comes to the position at right angles to the straight side C of the template illustrated in Fig. 8, the end 34 of the scale bar 31 will engage the stud 35 of the lower magnetic button B and prevent further rotative movement of the template generator and, hence of the tracer 25. In this position, that is, as shown in Fig. 4, the template generator is preferably clamped or secured by means of a third magnetic button 8D, the stud 35 of which is adapted to engage the back edge of the scale bar 17 and hold the end 34 of the scale 31 positively against the stud 35 of the center B. In this position, that is, tangent to the circular arcs at the ends of the proposed template, the tracer 25 is released from the hook 24, as indicated in Figs. 4 and 9, and permitted to follow down the straight edge of the scale 17, thereby generating the straight line edge C of the template shown in Fig. 8.

When the left straight side C of the template (Fig. 8) is completed, in the manner described, the template generator pivot 6 should be shifted to the lower magnetic button B—8 and the radius arm 1 set to 1½ inches. The graduated scale 31 which will now swing toward the upper part of the template, is set so that the end 34 thereof will be 3 inches from the edge of the scale 17. The stud 35 should then be placed in the upper magnetic button A—8, after which the operation, substantially as previously described, is repeated and the lower curve generated. The right straight edge C of the template may then be generated by blocking the generator and releasing the tracer 25 from the hook 24, as described, and permitting it to follow the edge of the scale bar 17, upward. The template may thus be completed by simply controlling the movements of the tracer by means of the template generator, as will be fully understood from the preceding description.

It will be understood that the same method may be employed for generating outside contours, as for instance, irregularly shaped patterns or profiles, such as a punch, substantially as indicated in Fig. 10. In this form of exterior contour, there is represented a substantially semi-circular portion, having radius E about the center F, and straight edges G, tangent to the circular curve of the radius E and also to the corner circular arcs, formed with radius H, about centers K. The contour of the punch, or shape shown in Fig. 10, is completed by the lower straight line L, tangent to the corner arcs about the centers K. In cutting this form (Fig. 10) the relative positions of the centers and the template generator scale bars is indicated in Fig. 11 from which it will be seen that the upper center F is established by securing to the fixture plate of the machine one of the magnetic buttons 8—F. The upper semi-circular curve is generated by making the radius arm 1 equal to the radius E plus the diameter of the tracer so as to place the tracer 25 outside of the circle of radius E, thereby compelling the cutter, which is the same diameter as the tracer, to follow the desired profile. When the circular curve on the radius E is completed, the scale bar 31 will engage a stud in the magnetic button 8—K after which, by freeing the tracer 25 from the hook 24, it will be permitted to follow down the straight edges of the scale 17, to complete the straight side G on the left, as indicated in Fig. 11. The template generator will then be shifted so that the radius arm 1 will be pivoted on the magnetic button at the center 8—K, the scale bars being adjusted to correspond to the radius H at the two lower corners of the form, as shown in Fig. 10. The circular curve of the left corner on the radius H is then completed and the straight side L generated by releasing the tracer and permitting it to follow along the edge of the scale bar 17, as indicated at the lower side of Fig. 11. When this is completed the template generator is then pivoted about the left lower center 8—K, and the curve on the radius H generated, the rotation of the generator being determined by the engagement of the scale 31, with a stud 35 at the center 8—F in the magnetic button at this point. By releasing the tracer 25 and permitting it to follow up along the straight edge of the scale bar 17, the figure shown in Fig. 10 will be completely generated, the cut being made entirely on the outside without the necessity of employing a special pattern or template therefor.

From the above, it will be seen that with our improved template generator, any template or form having a cut-out interior contour composed of straight lines merging with circular arcs may be readily cut or generated by our method without the necessity of a preliminary pattern, for the measurements may be directly laid out on the fixture plate and the graduated scale bars of the template generator, which is adapted to control the movements of the tracer. Furthermore, in a similar manner, our method enables one to generate outside contours, such as punches or other irregular shapes, which are made up of straight lines tangent with circular arcs, and such forms may be generated directly by laying out the required measurements on the graduated scale bars of the template generator and establishing the desired centers on the fixture plate.

Establishing the centers for the template generator, on the fixture plate, may be done by ordinary tool maker's methods or by moving the tracer by means of the feed screws of the machine, to the desired points, and marking these points either by ordinary means or pivot studs. However, these points are preferably fixed by using the magnetic buttons as hereinbefore referred to. Furthermore, it is believed that the simplest way for laying out and establishing the various centers on the fixture plate is by the means and method of our laying out system, as shown and described in our application, Ser. No. 35,959, filed June 9, 1925.

While we have described the preferred form of apparatus for carrying out our improved template generating method, it will be understood that various forms and rearrangements of the apparatus may be employed and various forms of pivot centers or tool maker's buttons may be used in connection with the radius arms and straight edge scales for generating templates, according to our method; therefore, we do not wish to be limited to the specific details of construction or procedure for various modifications may be made therein without departing from the spirit and scope of the invention.

We claim:—

1. A template generator for contouring tracer controlled machines comprising a plurality of graduated bars adjustably clamped together at right angles to each other, a pivot carrying slide block adapted to be secured to one of said bars, a pivot button adapted to be secured to the fixture plate for directing the movements of the tracer and a second button secured to said fixture plate and adapted to limit the pivotal movement of said template generator about said pivot.

2. The template generator as claimed in claim 1, in which one of said graduated bars is adapted to serve as a radius arm rotating about the pivot button and means is provided for securing said radius arm to the tracer point, whereby the tracer under control of the tracer point will be compelled to move in a circular arm about said button pivot as a center.

3. In a template generator for contouring tracer controlled duplicating machines, the combination with an iron fixture plate located in a plane at right angles to the axes of the tracer and cutter, of an electro-magnetic button adapted to be secured to the face of said fixture plate by energization of said button, a radius arm and means for pivotally supporting said radius arm on said button as an established center for rotating said template generator.

4. The template generator as claimed in claim 3, in which said button is formed of soft iron and provided with annular cavities containing magnet coils for magnetizing the button to thereby attach it to the iron fixture plate.

5. The template generator as claimed in claim 3, in which said button is provided with magnet coils, adapted, with the body of the button, to form an electro-magnet, which, when energized in contact with said fixture plate, is adapted to become attached thereto for locating the desired center for the radius arm.

6. A template generator for contouring tracer controlled duplicating machines, comprising magentic buttons adapted to be electrically energized for attachment to the fixture plate of the machine, said button being adapted for establishing centers for controlling the movement of the template generator, a radius arm adapted to be pivotally mounted for rotation about one of said buttons, means for securing said radius arms to the point of the tracer for directing the movement of the tracer under control of the tracer point so as to follow a path concentric with the pivot of said radius arm and means associated with said radius arm for limiting the movement of the tracer in accordance with the form of the template to be generated.

7. The template generator as claimed in claim 6, in which a straight edge associated with said radius arm is adapted for guiding said tracer in forming straight portions of the template to be generated.

8. A template generating device for contouring tracer controlled machine tools comprising a radius arm adapted to be secured to the tracer point, means for pivotally supporting said radius arm, said radius arm being formed as a scale bar extending at right angles to a second scale bar, and means for securing the tracer point to the radius arm in a manner adapted to hold it in the angle between the two scale bars.

9. A template generating device for contouring tracer controlled machine tools comprising a pivotally supported radius arm connected with the tracer and formed as a scale bar, upon which there is adjustably clamped, at right angles thereto, another scale bar carrying a third scale bar adjustably clamped thereon parallel to the first scale bar, and means is provided for cooperative engagement with the end of said third scale bar for limiting the rotary movement of the radius arm or first scale bar.

10. A template generator for contouring tracer controlled machines comprising a radius arm for generating curves by directing the movements of the tracer, means for pivoting the radius arm for rotation by the tracer, means for attaching the tracer to said radius arm and adjustable means for varying the distance between the tracer and said pivoting means to vary the length of the radius arm.

11. The template generator as claimed in claim 10 wherein a straight edge is mounted in cooperative relation with said radius arm for directing the tracer in generating straight portions of the template.

12. A template generator for contouring tracer controlled machines comprising means for generating curved portions of the template by directing the tracer to follow the desired curve and means cooperating with the tracer to stop its motion when the desired curved portion of the template is completed.

13. The template generator as claimed in claim 12, wherein a straight edge is provided for directing the tracer for generating straight portions of the template and means adapted to engage the tracer and stop its motion when the straight portion of the template is completed.

14. A template generator for contouring tracer controlled machines comprising means cooperating with the tracer for directing its motion in following a predetermined path, adjustable means in conjunction with the last named means for varying the distance travelled by the tracer in its motion along said path and means cooperating with the tracer for stopping travel thereof at the end of the predetermined path.

JOHN C. SHAW.
ROBERT D. SHAW.